H. WIESENFELD.
STREET CAR REVERSIBLE SEAT.
APPLICATION FILED MAY 5, 1915.
1,158,612.
Patented Nov. 2, 1915.
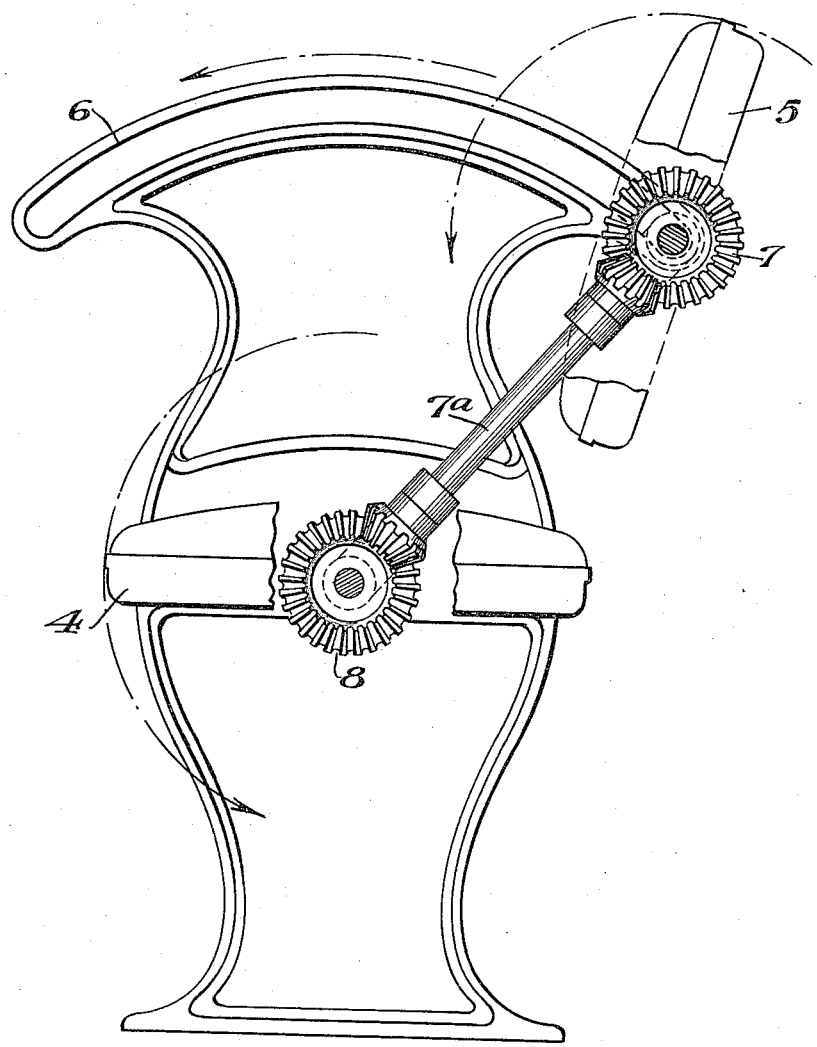
WITNESSES:
L. J. Forde
B. M. Doolin
INVENTOR
Herman Wiesenfeld.
BY G. H. Strong.
ATTORNEY

UNITED STATES PATENT OFFICE.

HERMAN WIESENFELD, OF WEST BERKELEY, CALIFORNIA.

STREET-CAR REVERSIBLE SEAT.

1,158,612.     Specification of Letters Patent.     Patented Nov. 2, 1915.

Application filed May 5, 1915. Serial No. 25,944.

*To all whom it may concern:*

Be it known that I, HERMAN WIESENFELD, a citizen of the United States, residing at West Berkeley, in the county of Alameda and State of California, have invented new and useful Improvements in Street-Car Reversible Seats, of which the following is a specification.

My invention relates to improvements in vehicle seats, and consists in the construction of transversely disposed seats, and in means by which the seats may be inverted to present either side uppermost, and pivoted turnable seat backs, with means connecting said backs with the seats, so that they may be reversed in unison.

It also comprises details of construction which will be more fully explained by reference to the accompanying drawings, in which the figure is a view of a seat and back and reversing means.

The seat here shown is designed to be placed transversely in street cars having side entrances. The car has seats disposed transversely, and access is had to the seats through doors opening through each side of the car. The seats extend transversely across the car and are so arranged as to present the transverse spaces between them opposite to the admission openings and doors.

In order to provide suitable and different accommodations for different classes of passengers who may travel to and from work in the early and late cars and those who travel in general later in the day, the seats 4 and backs 5 are reversible to present a non-upholstered surface on one side which will not be injured by rough or dirty clothes, while the other sides of both the seats and backs may be upholstered. In order to reverse the seats and the backs so as to present either surface to the occupant, they have pivots at each end turnable in the sides of the seat frames, the pivots of the seat backs 5 are supported in channels 6 of the frame and the seat pivots have stationary supports, about which the channels 6 are concentric. This enables the back to be carried around the seat pivot to face in either direction, to suit the direction of travel of the car.

The seat pivot and the back pivots have gears 7 and 8 fixed to them and engaging through intermediate gears and connecting shaft 7ª so that the seat and back will be simultaneously inverted to present a similar surface for use.

Having thus described my invention, what I claim and desire to secure by Letters Patent—

1. A seat and back reversing mechanism, comprising seat and back members each having centrally journaled pivot pins upon which they are turnable, segmental seat arms having guiding slots in which the pivot pins of the back are turnable and slidable; bevel pinions concentric with the pivot pins, and a shaft having co-acting pinions at its ends engaging those of the seat and back.

2. A car seat of the character described having transverse seat, central pivots for the seat and back, curved channels in the seat frame in which the pivots of the back may travel to invert the back, and intermeshing gear wheels fixed to the seat and back pivots with connecting shaft to insure their simultaneous inversion.

In testimony whereof I have hereunto set my hand in the presence of two subscribing witnesses.

HERMAN WIESENFELD.

Witnesses:
R. R. RUTHERFORD,
GEO. M. OLSON.

Copies of this patent may be obtained for five cents each, by addressing the "Commissioner of Patents, Washington, D. C."